United States Patent Office 3,481,919
Patented Dec. 2, 1969

3,481,919
PREPARATION OF ω-AMINODODECADIENIC LACTAM
Johan W. Garritsen and Johan A. Bigot, Geleen, Netherlands, assignors to Stamicarbon, N.V., Heerlen, Netherlands
No Drawing. Filed Apr. 4, 1966, Ser. No. 539,725
Claims priority, application Netherlands, Apr. 6, 1965, 6504348
The portion of the term of the patent subsequent to Apr. 8, 1986, has been disclaimed
Int. Cl. C07d 41/06
U.S. Cl. 260—239.3     5 Claims

ABSTRACT OF THE DISCLOSURE

A process for preparing ω-aminododecadienoic lactam hydrochloride by treating cyclododecadienone oxime with either hydrogen chloride, an imidochloride, an imidochloride-hydrochloride or mixtures thereof. The treatment is carried out in the presence of polar solvent such as nitro compounds of hydrocarbons, halogenated hydrocarbons, nitriles and mixtures thereof at a temperature between 30–150° C.

---

The present invention relates to a process for the preparation of ω-aminododecadienoic lactam. More specifically, the present invention relates to the process for the preparation of ω-aminododecadienoic lactam by the reaction of cyclododecadienone oxime with hydrogen cloride and/or imidochloride or imidochloride-hydrochloride in the presence of a polar solvent.

U.S. Patent No. 3,063,986 discloses a process for the Beckmann rearrangement. However, cyclododecadienone The process yields 80–85% of the corresponding unsaturated lactam when the rearrangement is carried out in a liquid sulphur dioxide medium with the aid of thionyl chloride.

According to the copending application of Johan W. Garritsen et al. Ser. No. 367,212, filed May 13, 1964, now U.S. Patent No. 3,437,655, lactams have been prepared from saturated cycloaliphatic ketoximes by reacting the oxime, in the form of oxime hydrochloride, with hydrogen chloride in a polar solvent. The lactam is produced by neutralization of the resultant lactam hydrochloride reaction product, to form the free base. In copending application Ser. No. 449,301 filed Apr. 19, 1965, now U.S. Patent 3,365,443 is disclosed to carry out the Beckmann rearrangement of saturated oximes by use of imidochloride or imidochloride-hydrochloride. As can be seen from the above discussion, saturated oximes are conventionally converted into the corresponding saturated lactam by the Beckmann rearrangement. However, cyclododicadienone oxime, an unsaturated oxime, cannot be converted into the corresponding unsaturated lactam by the normal Beckmann rearrangement, since the conventional catalysts, such as sulfuric acid or oleum, react with the double bonds in the unsaturated oxime, thereby forming undesired by-products.

Accordingly, it is an object of this invention to provide a novel and improved process for the preparation of ω-aminododecadienoic lactam. It is an additional object of this invention to provide a novel process for the conversion of cyclododecadienone oxime into ω-aminododecadienoic lactam in yields over 90%. Still further objectives and the scope of applicability of the present invention will become apparent from the detailed description given hereinafter. It will be understood, however, that the detailed description and specific examples, while indicating preferred embodiments of the invention, are given by way of illustration only, since various changes or modifications within the scope of the invention will become apparent to those skilled in the art from this detailed description.

It has now unexpectedly been found that in the preparation of ω-aminododecadienoic lactam from cyclododecadienone oxime high yields are obtained, and a minimum of undesirable by-products are formed, if the oxime is reacted with hydrogen chloride and/or an imidochloride or imidochloride-hydrochloride salt in the presence of a polar solvent. It is surprising that ω-aminododecadienoic lactam can be obtained from cyclododecadienone oxime in yields over 90% by reaction with hydrogen chloride with hardly any addition of hydrogen chloride to the carbon-carbon double bonds, as hydrogen chloride will readily react with unsaturated compounds at the point of unsaturation.

While most, if not all, polar solvents may be used in the process of the present invention, preferred polar solvents are nitro compounds of hydrocarbons, for example, nitro benzene and nitrocyclohexane, halogenated hydrocarbons, for example, chlorobenzene, chloroform, trichloroethylene and isopropylchloride, and nitriles, such as, for example, acetonitrile, benzonitrile and adiponitrile. Mixtures of the above or other polar solvents may be used.

The amount of solvent used in the process may be varied within wide limits. Quite large amounts, e.g. 200, 500 or 1000% by weight, or only relatively small amounts, e.g. 25 or 50% by weight, based on the weight of the oxime starting material, may be used. If relatively small amounts of solvent are used, part of the oxime may at first be present as a suspended solid, and later dissolve during the reaction. Also, part of the resulting lactam may be present as a solid in the reaction mixture.

The reaction temperature is preferably kept between 30 and 150° C. In this exothermic reaction, temperature control is quite simple. If desired, the reaction may be started at a lower temperature, for example, 10 to 20° C., and allowed to rise during the reaction. However, the major portion of the reaction is preferably in the range of 30 to 150° C.

No reaction pressure limitations are contemplated for the process of this invention. Usually the reaction is carried out at atmospheric pressure, but also higher pressures, e.g. 5, 10, 25, 50, 100 atm, or a still higher pressure may be used. If an elevated pressure is used, more hydrogen chloride or imidochloride may be present in the reaction mixture. The reaction may also be carried out at reduced pressure. It is then possible to adjust the temperature and the pressure that the solvent used boils during the reaction, part of it being discharged as a vapor and recycled after condensation.

The cyclododecadienone oxime is reacted with hydrogen chloride and/or imidochloride or imidochloride-hydrochloride in the process of the present invention. Imidochlorides are compounds with the divalent radical

Such compounds may be readily obtained, for example, from acid imides by reaction with phosgene and from nitriles by reaction with hydrogen chloride. The divalent imidochloride radical may be substituted with a wide variety of radicals or may be part of a ring structure. When the imidochloride radical is not part of ring structure, the carbon atom of the radical may be substituted by any saturated or unsaturated, substituted or unsubstituted hydrocarbon radicals. The nitrogen atom of the imidochloride radical may be substituted by hydrogen or an alkyl or aryl group. Examples of imidochlorides which may be used in the process of the present invention, which is not limited thereto, are acetimedochloride, benzimidochloride, adipimidochloride, N-propyl-acetimidochloride, N-butylbenzimidochloride, N-phenyl-hexahydrobenzimidochloride, and 2-chloro-azacycloheptene-1. The imidochlorides may also be used in the form of their hydrochlorides.

Preferably about equimolecular amounts or a slight excess of hydrogen chloride or imidochloride with respect to the amount of oxime is used. Generally, the reaction time is extended if less than stoichiometric amounts of imidochloride are used. In general, at least ½ mole of imidochloride, hydrogen chloride, or imidochloride-hydrochloride per mole of oxime should be used. While amounts of imidochloride or other chloride greatly in excess of the amounts of oxime may be used, for practical reasons, less than 10 moles of imidochloride or other chloride per mole of oxime are used.

The invention will be more clearly understood from the following examples, but it is to be understood to be in no way limited by the scope of the examples.

EXAMPLE I 40 grams of trans-cis-cyclododecadienone oxime is mixed with 100 ml. of acetonitrile in a ¼-litre reaction vessel provided with a stirrer, a reflux cooler and a gas inlet tube. 15 grams of hydrogen chloride gas is then fed into the reaction vessel at room temperature. The solution is heated to 70–75° C. and stirred, while this temperature range is maintained for 15 minutes, at which time the rearrangement is completed. The acetone is removed by distillation and the reaction product is dissolved in chloroform, the chloroform solution is washed with water until acid-free and the chloroform is then evaporated.

39.8 grams of ω-aminododecadienoic lactam of 97% purity are recovered, corresponding to an overall yield of 96.5%, based on the weight of the starting oxime material.

EXAMPLE II

The experiment described in Example I was repeated except that the oxime was replaced with 40 grams of trans-trans-cyclododecadienone.

The yield obtained is about the same as that of Example I.

EXAMPLE III

The experiment described in Example I was repeated except that the oxime was replaced with a mixture of 20 grams of trans-trans-cyclododecadienone and 20 grams of trans-cis-cyclododecadienone oxime. The yield obtained is about the same as that of Example I.

The ω-aminododecadienoic lactam product is dissolved in 200 ml of methanol, 1 gram palladium catalyst is added (5% palladium on activated carbon) and the solution is hydrogenated with hydrogen in a ½-litre autoclave for 30 minutes at a temperature of 50° C. and a pressure of 25 atmospheres. 38.4 grams of ω-laurinolactam product is obtained, corresponding to an overall yield of 95% based on the weight of oxime.

EXAMPLE IV

A mixture of 19.3 grams of trans-cis-cyclododecadienone oxime, 11.4 grams of N-methylformimidochloride-hydrochloride and 100 ml. of chloroform in a ¼-litre reaction vessel provided with a stirrer and a reflux cooler is heated for ½ hour at 65° C.

The reaction mixture after cooling is washed with diluted aqueous ammonia at 15–20° C., and the acid-free chloroform solution is subsequently distilled to remove the chloroform.

The product obtained is 20 grams of ω-aminododecadienoic lactam (96% purity) corresponding to a yield of 99.4%.

EXAMPLE V

A mixture of 40 grams of trans-cis-cyclododecadienone oxime, 35 grams of benzimidochloride and 150 ml. of benzonitrile in a ½-litre reaction vessel provided with a stirrer and a reflux cooler is heated to 115° C. and stirred for 10 minutes at a temperature of 115–120° C. The benzimidochloride and the benzonitrile are removed by vacuum distillation and the resulting lactam product is washed with an aqueous caustic soda solution.

38.8 grams of ω-aminododecadienoic lactam of 97% purity is obtained, corresponding to an overall yield of 97%, based on the weight of oxime starting material.

EXAMPLE VI

The experiment described in Example V is repeated except that the benzonitrile is replaced with 150 ml. of chlorobenzene.

The yield obtained is about the same as that of Example V.

EXAMPLE VII

The experiment described in Example V is repeated except that the benzimidochloride is replaced by 40 grams of N-butyl-benzimidochloride.

The yield obtained is about the same as that of Example V.

EXAMPLE VIII

The experiment described in Example V is repeated except that the benzimidochloride is replaced by 50 grams of N-phenyl-hexahydro-benzimidochloride-hydrochloride.

The yield obtained is about the same as that of Example V.

EXAMPLE IX

About the same results as in Example V are obtained with the substitution of nitrobenzene, nitrocyclohexane, acetonitrile, chloroform, trichloroethylene, isopropylchloride, or adiponitrile for the benzonitrile, used in the process of Example V. In addition, acetimidochloride or acetimidochloride-hydrochloride, adipimidochloride or adipimidochloride-hydrochloride, N-propyl - acetimidochloride, or N - propyl-acetimidochloride-hydrochloride, N - butyl-benzimidochloride-hydrochloride, N - phenyl-hexahydrobenzimidochloride and 2-chloroazacycloheptene-1 or 2-chloro-azacycloheptene - 1 - hydochloride, or mixtures of the above materials with hydrogen chloride, may be used in place of the benzimidochloride used in Example V.

It will be understood that the practice of this invention is not confined to the specific examples set forth above, but is only limited by the spirit and scope of the following claims.

I claim:

1. A process for preparing ω-aminododecadienoic lactam hydrochloride comprising treating cyclododecadienone oxime with hydrogen chloride in the presence of a polar solvent, whereby the said lactam hydrochloride is formed.

2. The process of claim 1 wherein the reaction is carried out at a temperature of 30 to 150° C.

3. The process of claim 2 wherein at least 25% by weight of the polar solvent, based on the weight of the oxime, is used.

4. The process of claim 3 wherein at least an equimolecular amount of said hydrogen chloride, with respect to the oxime, is used.

5. The process of claim 3 wherein the polar solvent is selected from the group consisting of nitro compounds of hydrocarbons, halogenated hydrocarbons, nitriles and mixtures thereof.

References Cited

UNITED STATES PATENTS 3,063,986  11/1962  Wilke et al. _____ 260—239.3
3,365,443   1/1968  Garritsen _____ 260—239.3

OTHER REFERENCES

Gould. "Structure and Mechanism in Organic Chemistry," pp. 618–21 (1959) (Holt-Dryden).

HENRY R. JILES, Primary Examiner

R. T. BOND, Assistant Examiner